US012780112B2

(12) United States Patent
Uozumi et al.

(10) Patent No.: US 12,780,112 B2

(45) Date of Patent: Nov. 3, 2026

(54) FIXING STRUCTURE OF HEATER FOR ONBOARD CAMERA

(71) Applicant: Kojima Industries Corporation, Toyota (JP)

(72) Inventors: Taichi Uozumi, Toyota (JP); Keiichiro Ito, Toyota (JP); Tomoyuki Shiono, Toyota (JP)

(73) Assignee: KOJIMA INDUSTRIES CORPORATION, Toyota (JP)

( * ) Notice: Subject to any disclaimer, the term of this patent is extended or adjusted under 35 U.S.C. 154(b) by 0 days.

(21) Appl. No.: 17/747,539

(22) Filed: May 18, 2022

(65) Prior Publication Data

US 2022/0371528 A1 Nov. 24, 2022

(30) Foreign Application Priority Data

May 21, 2021 (JP) ................................ 2021-086194

(51) Int. Cl.

*B60R 11/04* (2006.01)
*B60R 11/00* (2006.01)
*H04N 23/52* (2023.01)

(52) U.S. Cl.

CPC ............. *B60R 11/04* (2013.01); *H04N 23/52* (2023.01); *B60R 2011/0026* (2013.01); *B60R 2011/0043* (2013.01); *B60R 2011/0094* (2013.01)

(58) Field of Classification Search

None

See application file for complete search history.

(56) References Cited

U.S. PATENT DOCUMENTS 6,032,927 A * 3/2000 Atkinson ............... B25D 1/045 254/27
6,250,669 B1 * 6/2001 Ohmiya ................ B60R 21/205 280/752
6,782,196 B1 * 8/2004 Kuebler .................. B60S 1/488 392/484
10,272,849 B2 * 4/2019 Okuda .................... B60R 11/04
11,230,233 B2 * 1/2022 Takenouchi ............ B60R 11/04
12,214,731 B2 * 2/2025 Jo .......................... B60R 11/04
(Continued)

FOREIGN PATENT DOCUMENTS

CN 116552450 A * 8/2023 ............. B60R 11/04
JP 2002341432 A 11/2002
(Continued)

OTHER PUBLICATIONS

JPO Notice of Reasons for Refusal for corresponding JP Application No. 2021-086194; Issued Oct. 1, 2024.

*Primary Examiner* — Sath V Perungavoor

(74) *Attorney, Agent, or Firm* — CANTOR COLBURN LLP

(57) ABSTRACT

An onboard camera unit includes: a hood base holding an onboard camera; a hood plate covering the hood base from above; and a heater provided between the hood base and the hood plate. The hood base and the hood plate form a hood structure that allows a line of sight of the on-board camera to passes through an area between a front windshield and the hood structure. A space is provided between the hood base and the hood plate. The heater is fixed to a lower surface of the hood plate, and a clearance is provided between the heater and the hood base.

3 Claims, 9 Drawing Sheets

(56) References Cited

U.S. PATENT DOCUMENTS

| | | | | |
|---|---|---|---|---|
| 2004/0101293 | A1* | 5/2004 | Bissonnette | F24H 1/121 392/484 |
| 2006/0038668 | A1* | 2/2006 | DeWard | B60R 11/04 340/438 |
| 2012/0152997 | A1* | 6/2012 | McClain | A45F 5/021 224/676 |
| 2014/0160284 | A1* | 6/2014 | Achenbach | H04N 23/55 29/854 |
| 2015/0015713 | A1* | 1/2015 | Wang | H04N 23/55 348/148 |
| 2015/0251605 | A1* | 9/2015 | Uken | H04N 23/51 248/467 |
| 2016/0119509 | A1* | 4/2016 | Wato | G03B 17/55 348/148 |
| 2016/0318457 | A1* | 11/2016 | Nakano | H04N 23/55 |
| 2017/0240120 | A1* | 8/2017 | Krug | F16M 13/02 |
| 2017/0334364 | A1* | 11/2017 | Usami | B60S 1/56 |
| 2017/0334366 | A1* | 11/2017 | Sliwa | B60S 1/02 |
| 2019/0031116 | A1* | 1/2019 | Bulgajewski | H05B 3/84 |
| 2019/0080460 | A1* | 3/2019 | Nishijima | G06T 7/269 |
| 2019/0100158 | A1* | 4/2019 | Wato | B60R 11/04 |
| 2019/0168684 | A1* | 6/2019 | Higashimachi | G03B 17/561 |
| 2019/0170545 | A1* | 6/2019 | Higashimachi | B60R 11/04 |
| 2019/0208583 | A1* | 7/2019 | Kasetani | H05B 3/84 |
| 2019/0248300 | A1* | 8/2019 | Takagi | B60J 1/002 |
| 2020/0086791 | A1* | 3/2020 | Hardy | G06T 3/4038 |
| 2020/0094781 | A1* | 3/2020 | Ota | B60S 1/026 |
| 2020/0198540 | A1* | 6/2020 | Ohtaki | G07C 5/0808 |
| 2020/0198583 | A1* | 6/2020 | Kudo | B60S 1/026 |
| 2020/0231021 | A1 | 7/2020 | Kudo et al. | |
| 2020/0247330 | A1* | 8/2020 | Tokunaga | G03B 17/55 |
| 2020/0262361 | A1* | 8/2020 | Ueta | B60R 11/04 |
| 2020/0275533 | A1 | 8/2020 | Ochiai | |
| 2020/0391698 | A1* | 12/2020 | Fukuda | G01S 7/4813 |
| 2021/0094512 | A1* | 4/2021 | Kovach | B60R 11/04 |
| 2021/0368588 | A1* | 11/2021 | Semba | H05B 3/84 |
| 2022/0179066 | A1* | 6/2022 | Kaufman | G01S 7/027 |
| 2022/0295036 | A1* | 9/2022 | Kurihara | G03B 11/045 |
| 2022/0371528 | A1* | 11/2022 | Uozumi | H04N 23/52 |
| 2023/0415668 | A1* | 12/2023 | Fukuhara | B60R 11/04 |
| 2024/0424766 | A1* | 12/2024 | Remacle | C03C 27/10 |
| 2025/0010805 | A1* | 1/2025 | Chartrand | B60R 11/04 |

FOREIGN PATENT DOCUMENTS

| | | | | | |
|---|---|---|---|---|---|
| JP | 2017523088 | A | | 8/2017 | |
| JP | 2019093794 | A | | 6/2019 | |
| JP | 2019142325 | A | | 8/2019 | |
| JP | 2020117070 | A | | 8/2020 | |
| JP | 2020125088 | A | | 8/2020 | |
| JP | 2020131809 | A | | 8/2020 | |
| JP | 2020138627 | A | * | 9/2020 | B60R 11/04 |
| JP | 7088078 | B2 | * | 6/2022 | B60R 11/04 |

* cited by examiner

FIXING STRUCTURE OF HEATER FOR ONBOARD CAMERA

CROSS REFERENCE TO RELATED APPLICATION

The present invention claims priority under 35 U.S.C. § 119 to Japanese Application No. 2021-086194, filed on May 21, 2021, the entire contents of which being incorporated herein by reference.

TECHNICAL FIELD

The present disclosure relates to a fixing structure of a heater for an onboard camera and, in particular, to improvement in a structure for fixing a heater for onboard glass.

BACKGROUND

There are automobiles in which a camera is mounted to a cabin side of a front windshield. The camera is used when automatic travel control is executed, for example. In this case, the camera captures a video image of an object, such as a lane painted on a road, as a criterion of a travel path and sends video data to a travel controller. The travel controller executes the automatic travel control on the basis of the video data. In addition to the above, there is a case where the camera is used as a dashboard camera.

A technique of attaching a camera mounting structure to windshield glass (front windshield glass) of the automobile is disclosed in the following PATENT LITERATURE 1. The camera mounting structure disclosed in PATENT LITERATURE 1 includes a hood member that is provided below a line of sight of the camera. The hood member is provided with a heater that prevents fogging of the windshield glass.

CITATION LIST

PATENT LITERATURE 1: JP 2020-125088 A
PATENT LITERATURE 2: JP 2020-131809 A

SUMMARY

In the camera mounting structure, various structures are formed to be attached to the automobile. For example, in a camera mounting structure described in PATENT LITERATURE 2, a plate spring is provided to the hood member, and is used to attach an onboard camera device to the automobile while being slid in a particular direction. In the conventional technique, a heater attachment area may be limited depending on a position or a shape of the structure for attaching the camera to the automobile. In addition, depending on a heater attachment position, the heater may have an optical influence on the camera. For example, it is considered that when the heater is arranged on the windshield glass side of the hood member described in PATENT LITERATURE 1, 2, quality of the captured video image may be degraded by diffuse reflection caused by the heater.

The present disclosure has a purpose of securing a sufficient area for arranging a heater while suppressing an optical influence on a camera in a structure for fixing an onboard camera to an automobile.

The present disclosure includes: a hood base that is fixed to an automobile; a hood plate that covers the hood base from above; and a heater that is provided between the hood base and the hood plate. The hood base and the hood plate form a hood structure that allows a line of sight of an on-board camera to pass through an area between onboard glass and the hood structure.

In one embodiment, a space is provided between the hood base and the hood plate.

In one embodiment, the heater is fixed to a lower surface of the hood plate, and a clearance is provided between the heater and the hood base.

In one embodiment, the hood base forms a sidewall and a rear wall of the hood structure, and the heater is at least partially surrounded by the sidewall and the rear wall.

In one embodiment, the hood base holds the onboard camera.

In one embodiment, a bracket that is fixed to the automobile is provided, the hood base is fixed to the automobile via the bracket, and the bracket holds the onboard camera.

In one embodiment, the hood plate is formed of a material that conducts heat more easily than the hood base.

According to the present disclosure, it is possible to secure a sufficient area for arranging the heater while suppressing an optical influence on the camera.

BRIEF DESCRIPTION OF DRAWINGS

Embodiment(s) of the present disclosure will be described based on the following figures, wherein.

DESCRIPTION OF EMBODIMENTS

A description will hereinafter be given of embodiments of the present disclosure with reference to the drawings. Terms such as up, down, right, left, front, and rear in the present specification each mean a direction that is as seen from an occupant of an automobile. The same component illustrated in plural drawings will be denoted by the same reference sign, and a description thereon will be simplified after the description thereon has been given once.

Figure 1:
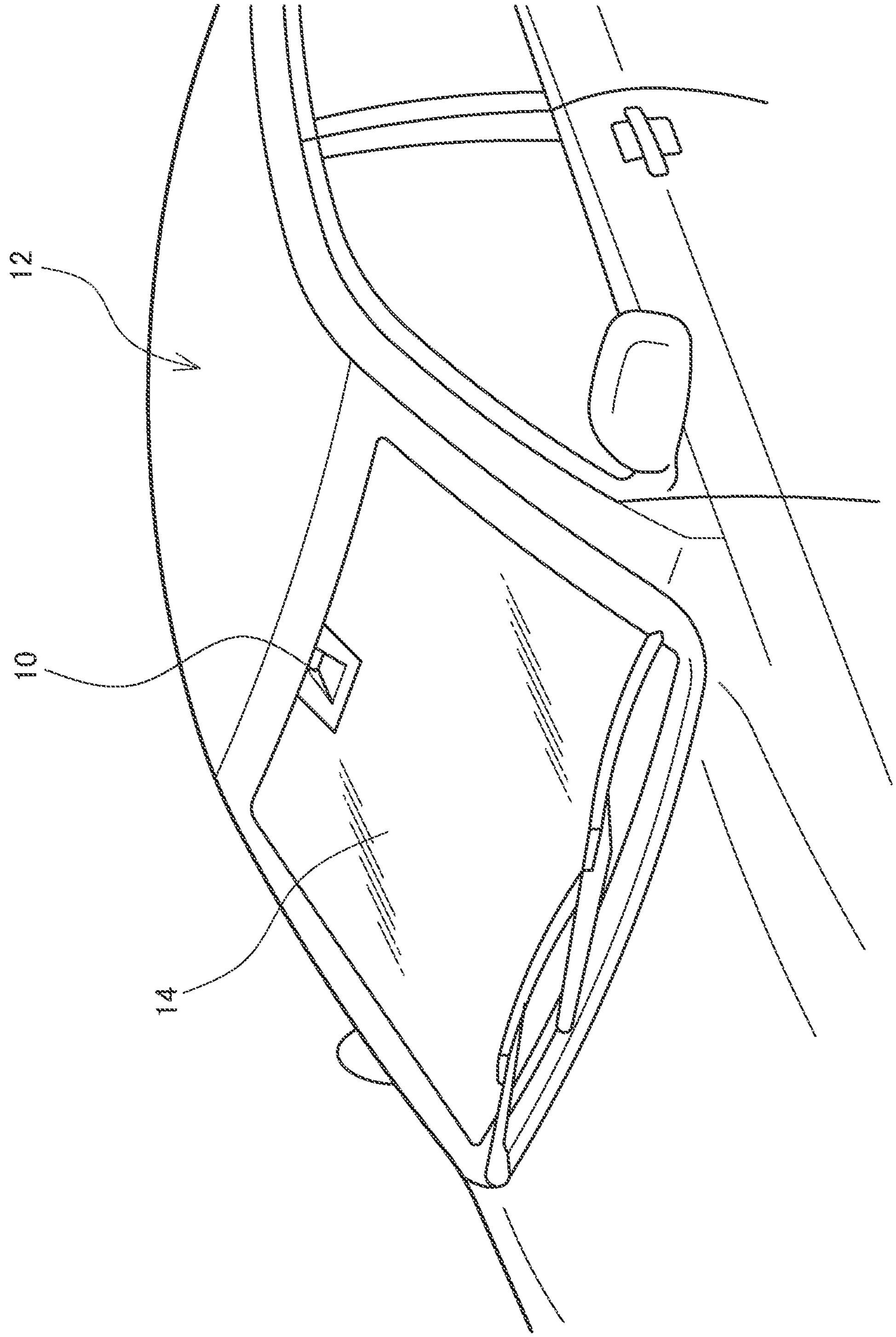
FIG. 1 is a view illustrating an automobile to which an onboard camera unit is mounted.

FIG. 1 illustrates an automobile 12 to which an onboard camera unit 10 according to a first embodiment of the present disclosure is mounted. The onboard camera unit 10 is fixed to an upper portion on a cabin-side surface of a front windshield 14 (onboard glass). The onboard camera unit 10 is used when automatic travel control is executed, for example. In this case, the onboard camera unit 10 captures a video image of an object, such as a lane painted on a road, as a criterion of a travel path, and sends video data to a travel controller. The travel controller executes the automatic travel control on the basis of the video data. In addition to the above, the onboard camera unit 10 may be used as a dashboard camera.

There is a case where moisture in the form of fog, frost, ice, or the like adheres to a surface of the front windshield 14. In the case where the moisture adheres to the front windshield 14, quality of the video image captured by a camera is possibly degraded. Thus, as will be described below, the onboard camera unit 10 includes a heater.

Figure 2:
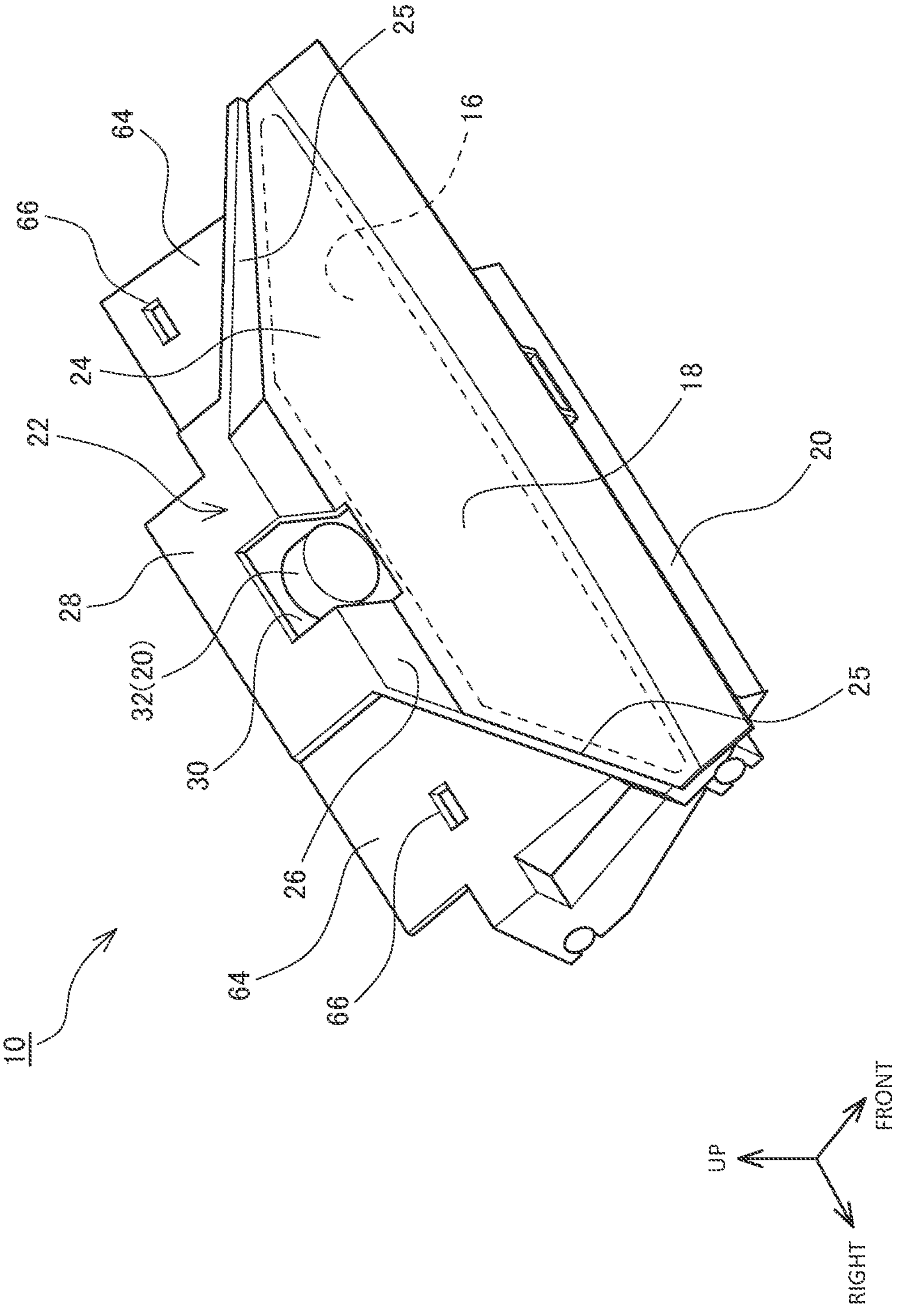
FIG. 2 is a perspective view of the onboard camera unit.

FIG. 2 is a perspective view of the onboard camera unit 10. The onboard camera unit 10 includes an onboard camera 20, a hood base 22, a hood plate 24, and a heater 16. The hood base 22 holds the onboard camera 20 downward, and the hood plate 24 covers a bottom surface of a recessed area that is located above the hood base 22. The hood base 22 and the hood plate 24 constitute an onboard heater fixing structure. As will be described below, the heater 16 is provided between the hood plate 24 and the hood base 22. The hood base 22 and the hood plate 24 form a hood structure 18 that is recessed downward, that is, toward a cabin. The hood structure 18 has a folding-fan shape that is recessed most deeply in a rear portion thereof and is wider and shallower to the front.

In right, left, and rearmost portions of the hood structure 18, sidewalls 25 and a rear wall 26, each of which extends in an up-down direction, are respectively formed by the hood base 22. A plate-shaped rear area 28 stretches rearward from an upper end of the rear wall 26. A camera hole 30 is formed in the rear wall 26 and the rear area 28. The hood base 22 holds the onboard camera 20 at a position below the hood base 22. An imaging section 32 of the onboard camera 20 is located at a position that is behind a portion of the camera hole 30 provided in the rear wall 26 and that is below a portion of the camera hole 30 provided in the rear area 28. The imaging section 32 looks forward via the camera hole 30. The imaging section 32 has an electronic device that converts light into an electrical signal. In FIG. 2, an example is illustrated in which the imaging section 32 is arranged at the position that is behind the portion of the camera hole 30 provided to the rear wall 26 and that is below the portion of the camera hole 30 provided to the rear area 28. However, the imaging section 32 may penetrate the camera hole 30 in a front-rear direction.

From each of the right and left sidewalls 25 in the hood base 22, a flange 64 that is used to fix the hood base 22 to the automobile stretches rearward. Each of the right and left flanges 64 is provided with a fixing hole 66 that is used to fix the hood base 22 to the automobile.

The hood plate 24 is formed in a substantially trapezoidal shape and forms a bottom surface of the hood structure 18. The heater 16 is provided on a lower surface of the hood plate 24. The front windshield 14 is located in front of the imaging section 32 and above the hood structure 18. The hood structure 18 formed by the hood base 22 and the hood plate 24 allows a line of sight of the imaging section 32 to pass through an area between the front windshield 14, which is located in front of the imaging section 32, and the imaging section 32 while blocking unnecessary light for the imaging section 32.

Figure 3:
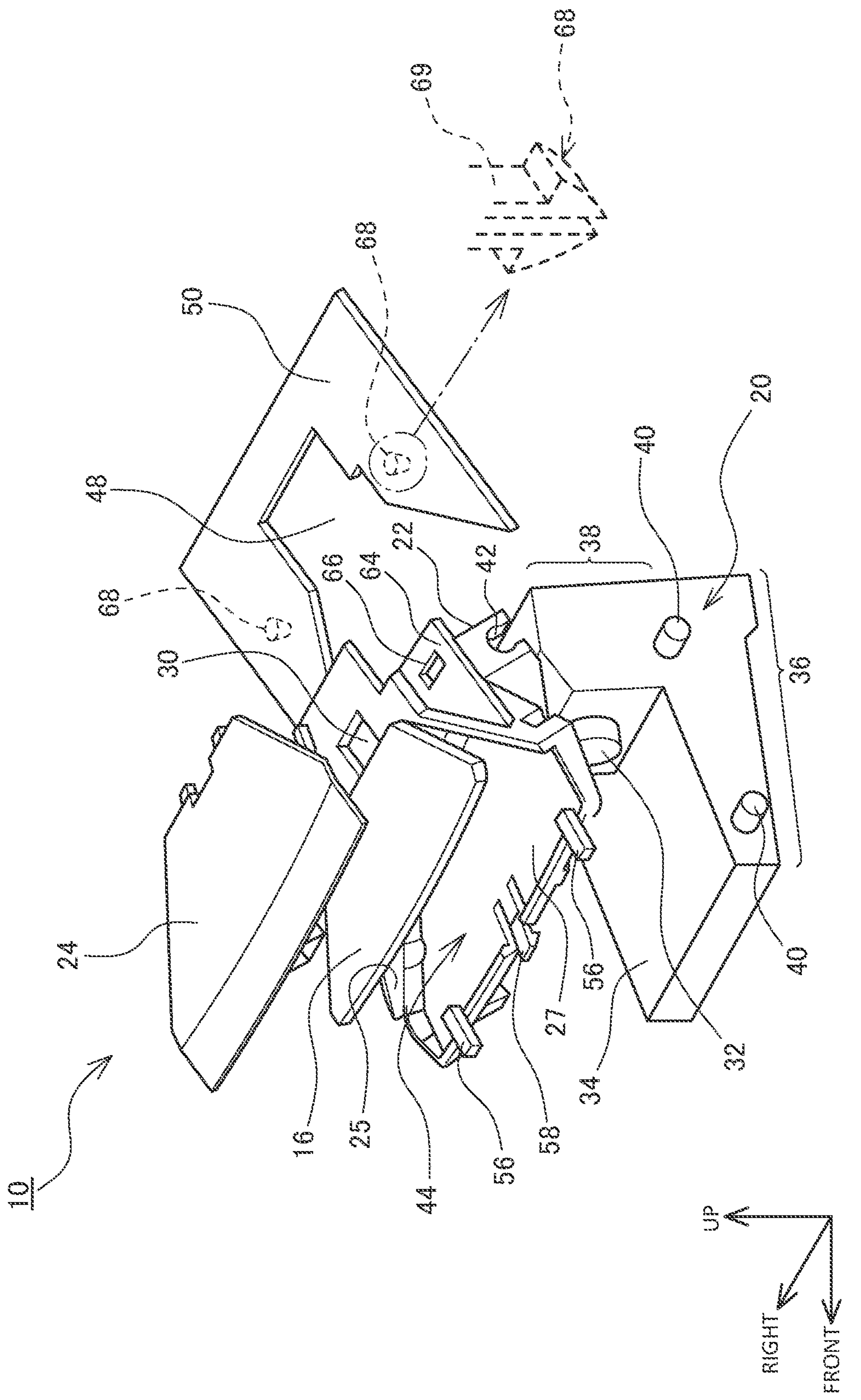
FIG. 3 is an exploded perspective view of the onboard camera unit.

FIG. 3 is an exploded perspective view of the onboard camera unit 10. The onboard camera unit 10 includes a bracket 50 in addition to the onboard camera 20, the hood base 22, the hood plate 24, and the heater 16. The onboard camera 20 includes an L-shaped casing 34. The L-shaped casing 34 includes a base section 36 and a vertical section 38 that is projected upward from the rear of the base section 36. The imaging section 32 is fixed to a front surface of the vertical section 38.

Two columnar camera projections 40 are formed on each of right and left surfaces of the L-shaped casing 34. On each of the right and left surfaces, the camera projections 40 are arranged in the front-rear direction. Each of the camera projections 40 is projected to the left from the left surface of the L-shaped casing 34, and each of the camera projections 40 is projected to the right from the right surface thereof. Each of the camera projections 40 may have a shape of a polygonal column.

The hood base 22 has a shape that covers an upper surface of the base section 36 and the front and upper surfaces of the vertical section 38 in the L-shaped casing 34. As will be described below, a fitting groove 42 is formed on each of right and left sides of the hood base 22, and each of the camera projections 40 is fitted into the respective fitting groove 42. When each of the camera projections 40 in the L-shaped casing 34 is fixed to the respective fitting groove 42 of the hood base 22, the L-shaped casing 34 is fixed to the hood base 22. In other words, the onboard camera 20 is fixed to the hood base 22 such that the upper surface of the base section 36 and the front and upper surfaces of the vertical section 38 are covered with the hood base 22 and such that the imaging section 32 looks forward from the camera hole 30.

On an upper side of the hood base 22, a recessed area 44 in a folding-fan shape that is wider and shallower to the front is formed. The hood plate 24 has a substantially trapezoidal shape in which a rear lateral side is shorter than a front lateral side. The heater 16 also has a substantially trapezoidal shape in which a rear lateral side is shorter than a front lateral side. The heater 16 is fixed to the lower surface of the hood plate 24 such that a direction of each of the sides of the hood plate 24 matches a direction of a respective one of the sides of the heater 16. In the heater 16, electric heating wires may be embedded in a plate-shaped member. The heater 16 may be fixed to the hood plate 24 by a double-sided tape. The hood plate 24 may be formed of a material that conducts heat more easily than the hood base 22. A material constant that indicates ease of heat transfer is thermal conductivity, and the hood plate 24 may be formed of a material with higher thermal conductivity than the hood base 22. For example, the hood plate 24 may be formed of metal, and the hood base 22 may be formed of a plastic resin.

A fixing projection 56 is projected forward from each of right and left portions of a front edge of the hood base 22, and a fixing claw 58 is projected forward from a center portion thereof. The right and left fixing projections 56 and the fixing claw 58 are engaged with the hood plate 24. In a state where the heater 16 is fixed to the lower surface of the hood plate 24, the hood plate 24 is fixed to the hood base 22 in a manner to cover a bottom surface of the recessed area 44 in the hood base 22.

The bracket 50 is a plate-shaped member that is provided with a notched area 48 from the front to the rear in a manner to correspond to shapes of side surfaces and a back surface of the hood base 22. A hood base attachment projection section 68 is formed on a lower surface of each of right and left areas that sandwich the notched area 48. On the right side of FIG. 3, an enlarged view of the hood base attachment projection section 68 is provided. The hood base attachment projection section 68 has a pair of clawed projections 69. Each of the clawed projections 69 is projected downward, has a claw at a tip, and elastically flexes from side to side. A thickness in a right-left direction of the claw at the tip is increased upward from a lower end and is abruptly reduced in a wedge-like fashion.

Before the hood base 22 is attached to the bracket 50, the bracket 50 may be fixed to the cabin-side surface of the front windshield 14. The hood base 22 enters the notched area 48 of the bracket 50. Then, the hood base attachment projection section 68 is inserted into the fixing hole 66 that is provided to each of the right and left flanges 64 of the hood base 22. As a result, the hood base 22 is fixed to the front windshield 14 via the bracket 50, and the onboard camera unit 10 is fixed to the front windshield 14. The bracket 50 may be fixed to a position near a boundary between the front windshield 14 and a body of the automobile.

Figure 4:
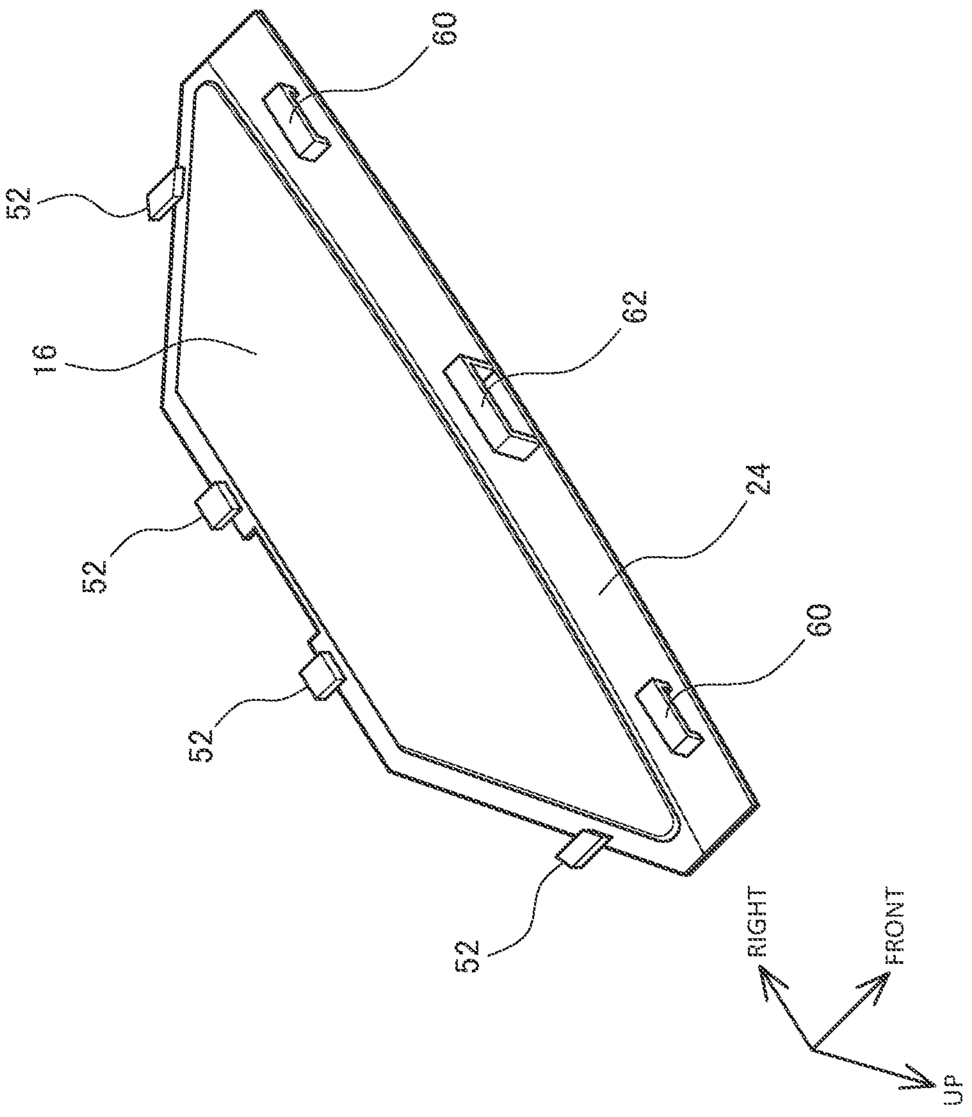
FIG. 4 is a view illustrating a hood plate to which a heater is fixed.

FIG. 4 illustrates the hood plate 24 to which the heater 16 is fixed. In this drawing, the hood plate 24 and the heater 16 are seen obliquely upward to the right. Two fixing claws 52 are projected rearward from a rear edge of the hood plate 24. The fixing claw 52 is projected rearward from each of right and left edges of the hood plate 24. A fixing projection receiving structure 60 is formed in each of right and left portions of a front edge of the hood plate 24, and a fixing claw receiving structure 62 is formed in a center portion thereof. Each of the fixing projection receiving structure 60 and the fixing claw receiving structure 62 is formed in a U-shape and, together with the lower surface of the hood plate 24, forms a hole.

Figure 5:
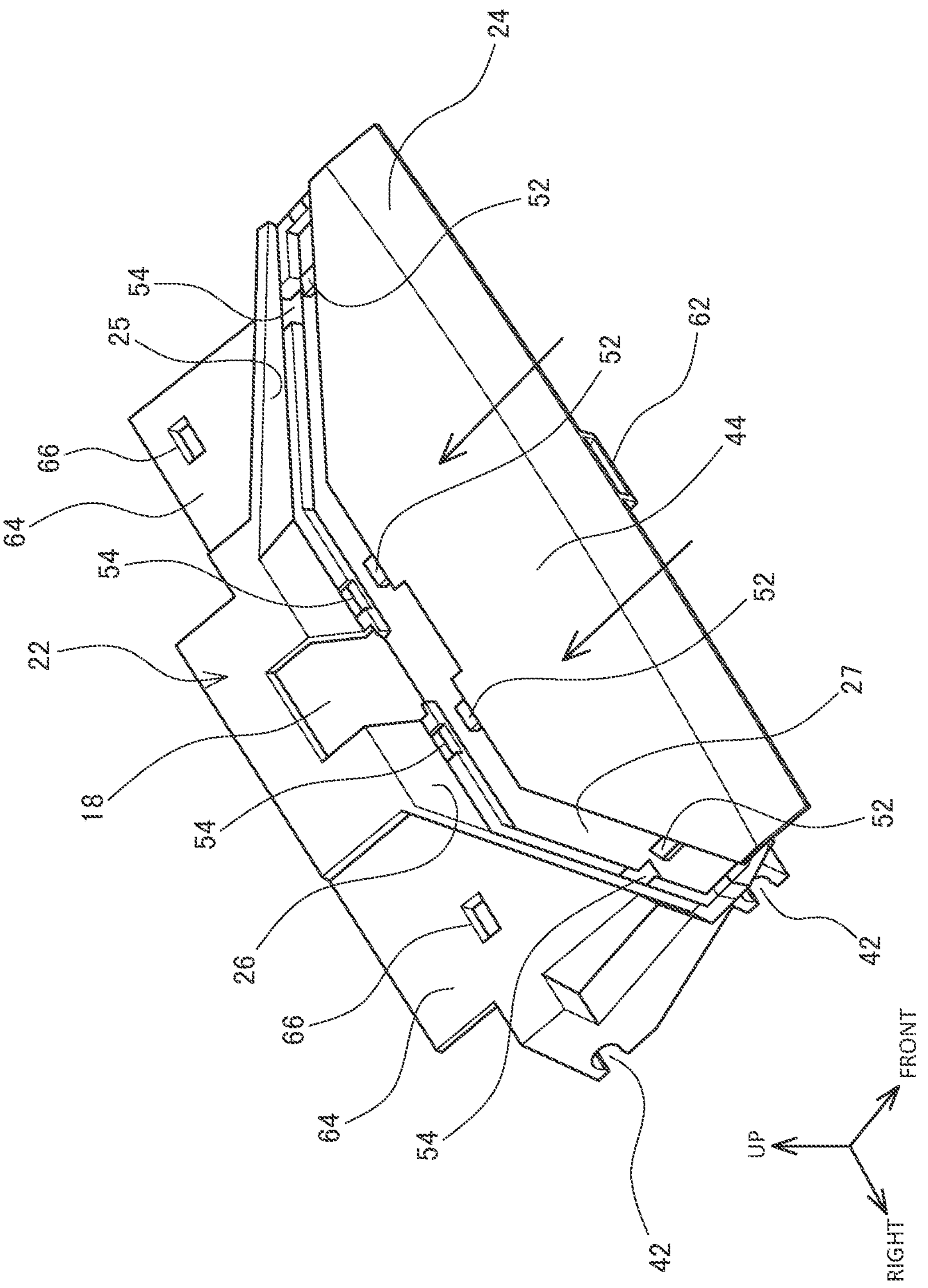
FIG. 5 is a view illustrating a process of attaching the hood plate to a hood base.

FIG. 5 illustrates a step of attaching the hood plate 24 to the hood base 22. The recessed area 44 in the hood base 22 is formed by the rear wall 26 that is vertically arranged behind the hood base 22, the sidewalls 25 that are vertically arranged on the right and left sides, and a bottom plate 27 that forms the bottom surface. In a boundary between the rear wall 26 and the bottom plate 27 in the recessed area 44, claw receiving structures 54 are formed to receive the two claws 52, each of which is projected from the rear edge of the hood plate 24. In a boundary between the bottom plate 27 and each of the right and left sidewalls 25, the claw receiving structure 54 is formed to receive the claw 52 that is projected from respective one of the right and left edges of the hood plate 24.

By moving the hood plate 24 in a direction indicated by arrows in FIG. 5, the fixing claw 58 and the right and left fixing projections 56 are respectively engaged with the fixing claw receiving structure 62 and the right and left fixing projection receiving structures 60. In other words, the fixing claw 58 is hooked onto the fixing projection receiving structure 62, and the fixing projections 56 are held by the right and left fixing claw receiving structures 60. In addition, by moving the hood plate 24 in the direction indicated by the arrows in FIG. 5, each of the claws 52 of the hood plate 24 is inserted into the corresponding claw receiving structure 54, and each of the claws 52 is fixed to the corresponding claw receiving structure 54. In this way, the hood plate 24 is fixed to the hood base 22.

Figure 6:
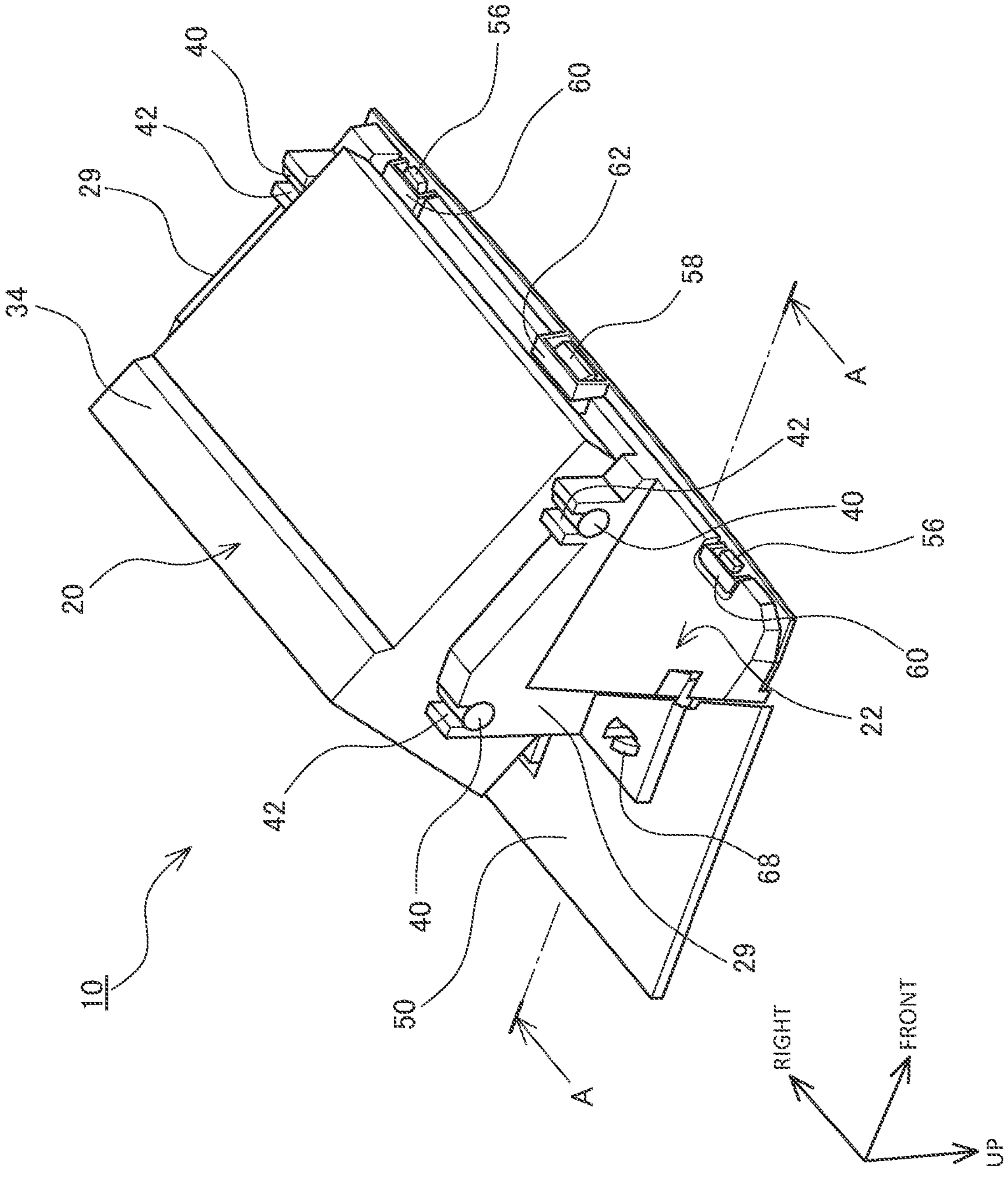
FIG. 6 is a perspective view in which the onboard camera unit is seen from a cabin side.

FIG. 6 is a perspective view in which the onboard camera unit 10 is seen obliquely upward to the right (the cabin side). On right and left sides of the onboard camera 20, a camera fixing wall 29 is vertically provided from a lower surface of the hood base 22 and along the side surface of the L-shaped casing 34. A height of the camera fixing wall 29 is reduced from the rear to the front in a manner to correspond to a shape of the side surface of the L-shaped casing 34. The fitting grooves 42, into which the two camera projections 40 arranged in the front-rear direction are fitted, are formed at a lower edge of each of the camera fixing walls 29. When each of the camera projections 40 is fixed to the corresponding fitting groove 42, the onboard camera 20 is fixed to the hood base 22. In this way, a camera holding structure which is constructed with the camera fixing wall and holds the onboard camera 20 is formed on the cabin side of the hood base 22.

Figure 7:
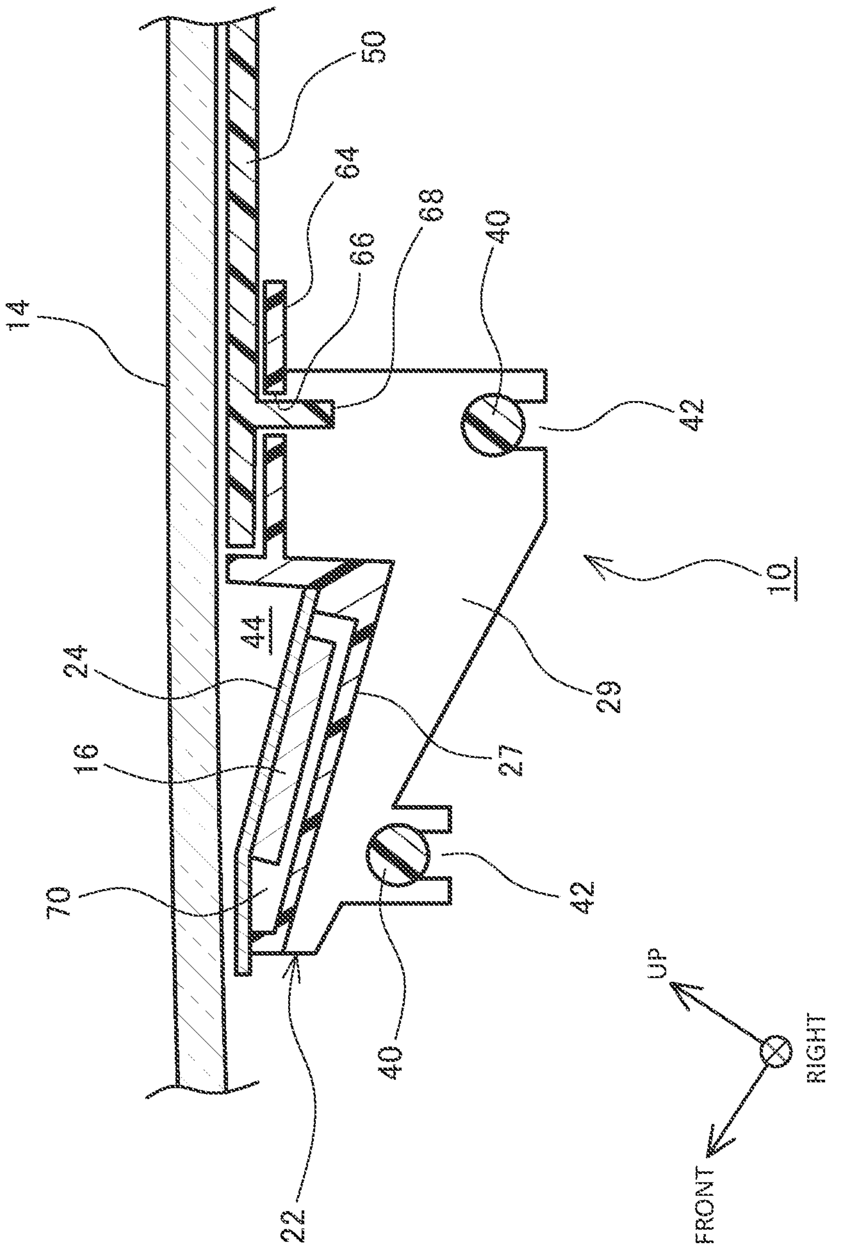
FIG. 7 is a view illustrating a cross section of the onboard camera unit.

FIG. 7 illustrates a cross section that appears when the onboard camera unit 10 is cut along line AA in FIG. 6. Here, with regard to the onboard camera 20, only the camera projections 40 are illustrated, and the other portions thereof are not illustrated. The bracket 50 is fixed to the front windshield 14. An upper surface of the bracket 50 may contact the cabin-side surface of the front windshield 14. The hood base 22 is fixed to the bracket 50 and is then fixed to the front windshield 14 via the bracket 50. The hood plate 24 covers the bottom surface of the recessed area 44 in the hood base 22. A space 70 is provided between the hood plate 24 and the hood base 22. This space 70 may be surrounded by the sidewalls 25 and the rear wall 26 of the hood base 22 and may be a sealed space that suppresses entry of air from the outside. The heater 16 is fixed to the lower surface of the hood plate 24, and the heater 16 is provided in the space 70 that is formed between the hood plate 24 and the hood base 22. In addition, a clearance is provided between a lower surface of the heater 16 and the hood base 22.

When electric power is supplied to the heater 16, the heater 16 generates heat and provides the heat to the hood plate 24, and the heat is provided to a space between the front windshield 14 and the hood plate 24. In this way, the heat is provided to the front windshield 14 and prevents the moisture from adhering to the front windshield 14. In addition, in the case where the moisture adheres to the front windshield 14, evaporation of the moisture is promoted.

In the onboard camera unit 10 according to this embodiment, the bottom surface of the recessed area 44 in the hood base 22 is covered with the hood plate 24. In this way, the bottom surface of the recessed area 44 in the hood base 22 is covered, and aesthetic appearance is improved. In addition, since the heater 16 does not appear on an upper surface of the hood structure 18, the heater 16 is prevented from having an optical influence on the onboard camera 20. Furthermore, the space 70 between the hood plate 24 and the hood base 22 is effectively used as a space for arranging the heater 16. Moreover, the heater 16 is fixed to the lower surface of the hood plate 24. Accordingly, even when the bottom surface of the recessed area 44 in the hood base 22 is uneven, the heater 16 can easily be fixed to the onboard camera unit 10.

While the heater 16 is in contact with the hood plate 24, there is the clearance between the heater 16 and the hood base 22. The heater 16 is at least partially surrounded by the sidewalls 25 and the rear wall 26 of the hood base 22. As a result, the heat is more likely to be conducted to the hood plate 24 side than the hood base 22, and thus an effect of heating the front windshield 14 is enhanced. In the case where the hood plate 24 is formed of the material that easily conducts heat, or in the case where the space 70 between the hood plate 24 and the hood base 22 is sealed, the heat generated by the heater 16 is easily conducted to the hood plate 24, and thus the effect of heating the front windshield 14 is enhanced. In other words, since the space 70 is covered with the hood plate 24 and the hood base 22, the heat in the space 70, which is heated by the heater 16, is not released to the outside of the hood base 22, and thus thermal efficiency of the heater 16 is improved. In addition, since the air has an adiabatic effect, the heat is less likely to be conducted to the space 70 while the heat generated by the heater 16 is efficiently conducted to the hood plate 24. Thus, electric power consumption of the heater 16 is reduced.

In the onboard camera unit 10 according to this embodiment, in the state where the onboard camera 20 is attached to the hood base 22, the hood base 22 can freely be attached to/detached from the bracket 50. Accordingly, when the heater 16 fails, the heater 16 can be exchanged in the state where the onboard camera 20 is attached to the hood base 22.

Figure 8:
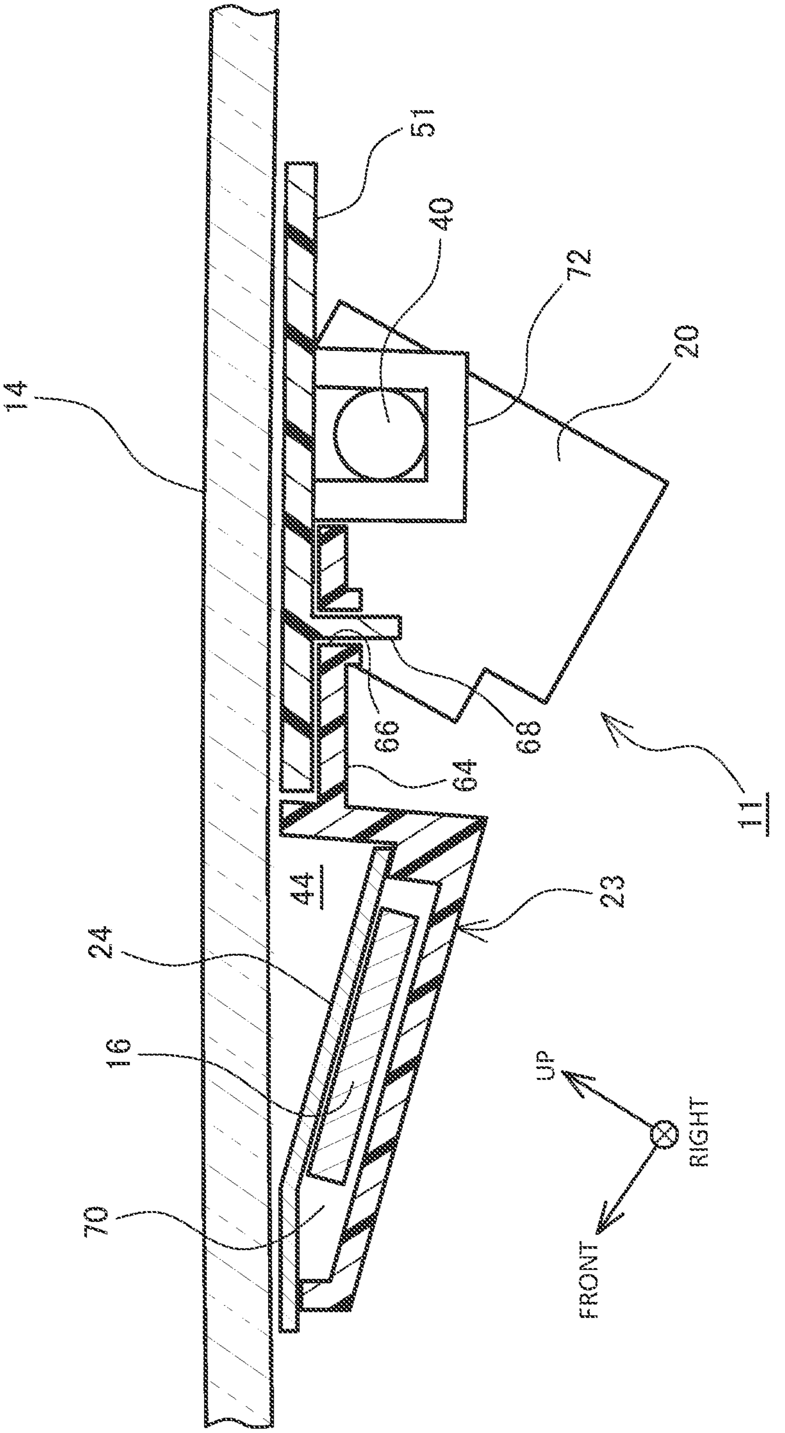
FIG. 8 is a view illustrating a cross section of an onboard camera unit according to a second embodiment.
Figure 9:
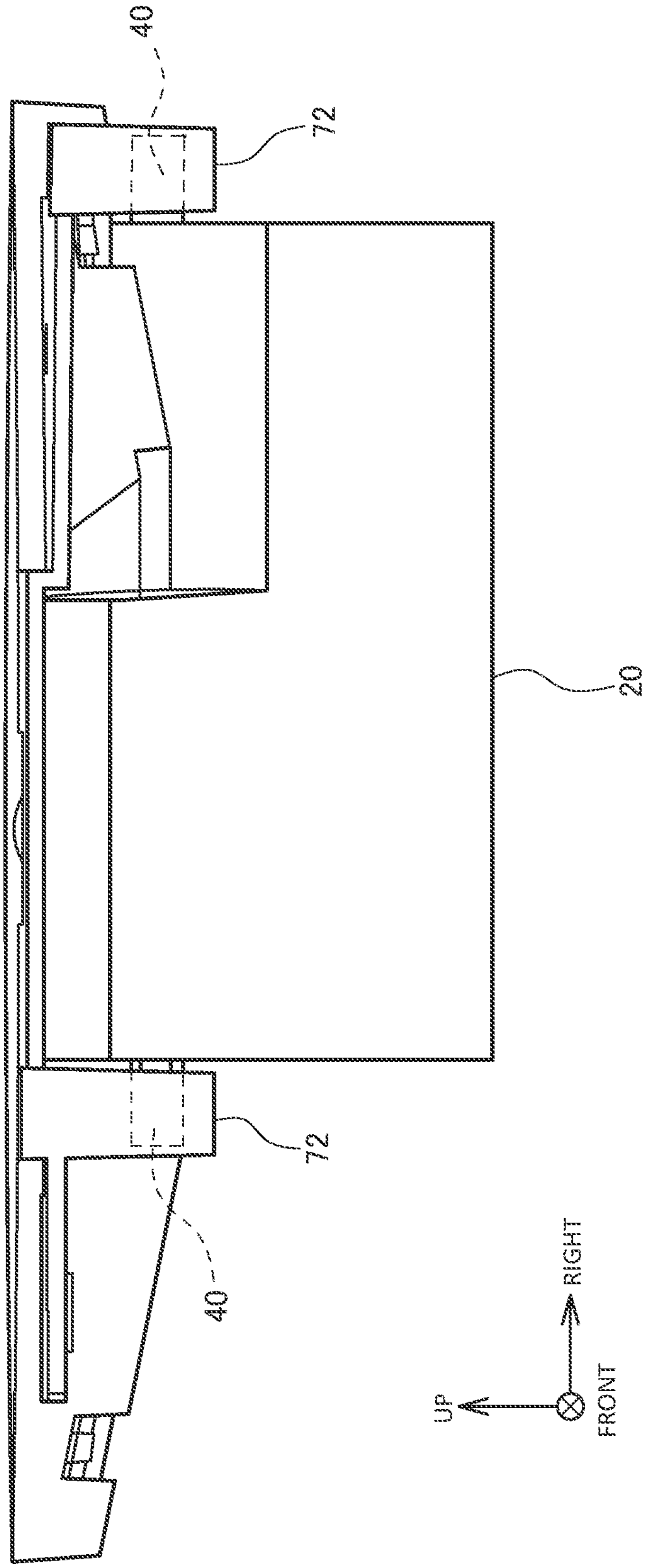
FIG. 9 is a view in which the onboard camera unit according to the second embodiment is seen from behind.

FIG. 8 illustrates a cross section of an onboard camera unit 11 according to a second embodiment of the present disclosure. FIG. 9 is a view in which the onboard camera unit 11 is seen from behind. In the onboard camera unit 11, the onboard camera 20 is held not by a hood base 23 but by a bracket 51. The hood base 23 has such a structure that the camera fixing walls 29 are removed from the hood base 22 illustrated in FIG. 7.

On a lower surface of the bracket 51, a U-shaped camera holding section 72 is formed behind the right and left hood base attachment projection sections 68. The paired camera holding sections 72 are arranged in the right-left direction while being separated from each other by a width of the onboard camera 20. The onboard camera 20 is positioned between the paired camera holding sections 72. The camera projection 40, which is projected to the left of the onboard camera 20, is inserted into a hole formed by the left camera holding section 72 and the lower surface of the bracket 51. Similarly, the camera projection 40, which is projected to the right of the onboard camera 20, is inserted into a hole formed between the right camera holding section 72 and the bracket 51. In this way, the onboard camera 20 is held by the bracket 51.

In the onboard camera unit 11 according to this embodiment, in the state where the onboard camera 20 is attached to the bracket 51, the hood base 22 can freely be attached to/detached from the bracket 51. Accordingly, when the heater 16 fails, the heater 16 can be exchanged in the state where the onboard camera 20 is attached to the bracket 51.

The above description has been given of the embodiment in which the onboard camera unit 10 is used for the front windshield 14 of the automobile. However, the onboard camera unit 10 according to the present disclosure may be used for other onboard glass of the automobile.

The invention claimed is:

1. A fixing structure of a heater for an onboard camera, the fixing structure comprising:
- a hood base that is fixed to an automobile;
- a hood plate that covers the hood base from above; and
- a heater that is provided between the hood base and the hood plate, wherein
- the hood base and the hood plate form a hood structure that allows a line of sight of an on-board camera to pass through an area between onboard glass and the hood structure, while blocking undesired light to the on-board camera,
- the heater is disposed below a lower surface of the hood plate,
- a lower surface of the heater is not contacted by another layer so that a space is defined directly below the lower surface of the heater,
- the hood base forms sidewalls, a rear wall, and a bottom plate of the hood structure,
- the space is surrounded by the sidewalls and the rear wall and sealed between the hood plate, the lower surface of the heater, the sidewalls, the rear wall and the bottom plate extending from the sidewalls and the rear wall,
- the hood base holds the onboard camera at a position below the hood base,
- the hood plate is formed in a substantially trapezoidal shape in which a rear side is shorter than a front side, and
- a camera hole is formed in the rear wall.

2. The fixing structure of a heater for an onboard camera according to claim 1, the fixing structure further comprising:
- a bracket that is fixed to the automobile, wherein
- the hood base is fixed to the automobile via the bracket, and
- the bracket holds the onboard camera.

3. The fixing structure of a heater for an onboard camera according to claim 1, wherein
- the hood plate is formed of a material that conducts heat more easily than the hood base.

* * * * *